United States Patent
Doganis

(10) Patent No.: US 11,543,889 B2
(45) Date of Patent: Jan. 3, 2023

(54) SELECTION OF A VERTEX WITH AN IMMERSIVE GESTURE IN 3D MODELING

(71) Applicant: DASSAULT SYSTEMES, Vélizy-Villacoublay (FR)

(72) Inventor: Fivos Doganis, Vélizy-Villacoublay (FR)

(73) Assignee: DASSAULT SYSTEMES, Velizy-Villacoublay (FR)

(*) Notice: Subject to any disclaimer, the term of this patent is extended or adjusted under 35 U.S.C. 154(b) by 0 days.

(21) Appl. No.: 17/136,885

(22) Filed: Dec. 29, 2020

(65) Prior Publication Data
US 2021/0200323 A1   Jul. 1, 2021

(30) Foreign Application Priority Data

Dec. 30, 2019 (EP) .................................. 19306792

(51) Int. Cl.
*G06F 3/01* (2006.01)
*G06F 30/12* (2020.01)
(Continued)

(52) U.S. Cl.
CPC .......... *G06F 3/017* (2013.01); *G06F 3/04815* (2013.01); *G06F 3/04842* (2013.01);
(Continued)

(58) Field of Classification Search
CPC .. G06F 3/017; G06F 3/04815; G06F 3/04842; G06F 30/12; G06F 2111/10;
(Continued)

(56) References Cited

U.S. PATENT DOCUMENTS 9,070,402 B2 * 6/2015 Burtnyk ............... G11B 27/034
11,175,749 B2 * 11/2021 Roziere ................ G06F 3/0486
(Continued)

FOREIGN PATENT DOCUMENTS

WO   2017/218367 A1   12/2017
WO   2019/178114 A1   9/2019

OTHER PUBLICATIONS

Bruno R. De Araujo, et al., "Mockup Builder: Direct 3D Modeling On and Above the Surface in a Continuous Interaction Space", Graphics Interface Conference 11, 2018 IEEE Conference on Virtual Reality and 3D User Interfaces (VR), IEEE, Mar. 18, 2018 (Mar. 18, 2018), pp. 320-326, XP033394602.
(Continued)

*Primary Examiner* — Michael Roswell
(74) *Attorney, Agent, or Firm* — Oblon, McClelland, Maier & Neustadt, L.L.P.

(57) ABSTRACT

A computer-implemented method for selecting a vertex among vertices of a 3D object in a 3D immersive environment of a CAD system where each vertex has a position in the 3D immersive environment including displaying the 3D object in the 3D immersive environment, detecting a hand gesture including opposing the pads of the index finger and the thumb, both pads being spaced, determining a segment parallel to a segment connecting the pads of the index finger and the thumb, the determined segment having a position in the 3D immersive environment, and identifying the vertex of the 3D object having the closest position with the determined segment.

18 Claims, 6 Drawing Sheets

(51) Int. Cl.
*G06F 3/04815* (2022.01)
*G06F 3/04842* (2022.01)
*G06F 111/18* (2020.01)
*G06F 111/10* (2020.01)

(52) U.S. Cl.
CPC .......... *G06F 30/12* (2020.01); *G06F 2111/10* (2020.01); *G06F 2111/18* (2020.01)

(58) Field of Classification Search
CPC ...... G06F 2111/18; G06F 3/011; G06F 30/10; G06F 3/0484; G06F 2203/04802; G06F 3/04847; G06F 3/0482; G06T 5/20; G06T 2200/24; H04N 5/23229; H04N 5/232933
See application file for complete search history.

(56) References Cited

U.S. PATENT DOCUMENTS

| | | | | |
|---|---|---|---|---|
| 2002/0056009 | A1* | 5/2002 | Affif | G06F 9/451 709/246 |
| 2010/0234094 | A1 | 9/2010 | Gagner et al. | |
| 2013/0268893 | A1* | 10/2013 | Maeda | G06F 3/0488 715/835 |
| 2015/0220149 | A1* | 8/2015 | Plagemann | G06F 3/017 715/856 |
| 2015/0234471 | A1* | 8/2015 | Niinuma | G06K 9/4652 345/156 |
| 2019/0146599 | A1 | 5/2019 | Gunnarsson et al. | |
| 2019/0146660 | A1 | 5/2019 | Holz et al. | |

OTHER PUBLICATIONS

Bret Jackson, et al., "Yea Big, Yea High: A 3D User Interface for Surface Selection by Progressive Refinement in Virtual Environments", Department of Mathematics, Statistics, & Computer Science Macalester College, 2018 IEEE Conference on Virtual Reality and 3D User Interfaces, pp. 320 326.

Daniel Leithinger et al., "Direct and Gestural Interaction with Relief, Proceedings of the 24th Annual ACM Symposium on User Interface Software and Technology", : Oct. 16-19, 2011, Santa Barbara, CA, USA, ACM, New York, NY, Oct. 16, 2011 (Oct. 16, 2011), pp. 541-548, XP058006154.

Anonymous:, "Selecting—Blender Manual 11", web.archive.org, Nov. 22, 2019 (Nov. 22, 2019), XP055692231.

Rafael Radkowski et al: "Interactive Hand Gesture-based Assembly for Augmented Reality Applications", Jan. 30, 2012 (Jan. 30, 2012), pp. 303-308, XP055234236, Retrieved from the Internet: URL:http://citeseerx.ist.psu.edu/viewdoc/download?doi=10.1.1.469.9714&rep=repl&type= pdf [retrieved on Dec. 7, 2015].

European Search Report dated Jun. 19, 2020, corresponding to European application No. 19306790.7.

Non-Final Office Action dated Jun. 8, 2022, issued in related U.S. Appl. No. 17/136,912.

* cited by examiner

SELECTION OF A VERTEX WITH AN IMMERSIVE GESTURE IN 3D MODELING

CROSS-REFERENCE TO RELATED APPLICATIONS

This application claims priority under 35 U.S.C. § 119 or 365 to European Application No. 19306792.3, filed Dec. 30, 2019. The entire contents of the above application(s) are incorporated herein by reference.

FIELD

The disclosure relates to the field of computer programs and systems, and more specifically to a method for selecting a vertex among vertices of a 3D object in a 3D immersive environment.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behaviour of a future product. CAM is an acronym for Computer-Aided Manufacturing, e.g. it relates to software solutions for defining manufacturing processes and operations. In such computer-aided design systems, the graphical user interface plays an important role in the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systémes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. Altogether, the system delivers an open object model linking products, processes, resources to enable dynamic, knowledge-based product creation and decision support that drives optimized product definition, manufacturing preparation, production and service.

CAD applications allow creating accurate 3D objects interactively. A 3D object is considered as accurate when the 3D object reproduces faithfully a corresponding real object. One criterion is to minimize the differences between the envelopes of the 3D object and the real object. Therefore, 3D objects created with CAD applications traditionally contain many small topological elements for the rough parts of the 3D objects. Several approaches for selecting the topological elements of interest for the design have been implemented. Traditionally, mouse-based approaches are used.

Here a small topological element may be defined as an element with a small visible surface. In a mouse based approach, a small topological element may be defined as an element with a small clickable surface. In other words, a small topological element in a mouse based approach is difficult to select because users need to be really precise to define the mouse position. The topological elements may also often overlap and/or be partially or totally occluded. Therefore even if the topological elements are not small, their clickable surface with a mouse-based approach may be small or even zero.

In a 3D application, a well-known problem is the ambiguity about which element users want to select. In a CAD application, mouse-based approaches tend to select the smallest element pointed by the cursor but this does not solve the ambiguity completely. In order to reduce this ambiguity, a well-known solution is to let users specify which type of topological element they want to select. Using this information, the elements are filtered by type during selection. This solution is time consuming and needs to display the various filters available for example in a 2D panel. Another problem during selection of elements is to reduce the number of mandatory clicks needed to select one element. For example, it is often necessary to zoom in on the zone of interest to select the element of interest of a 3D object. Changing the point of view of the 3D scene is also necessary when the element of interest is occluded. These two cases need several actions from user and are time consuming.

Recently, hand interactions are gaining importance in 3D design applications. Indeed, recent advances in immersive technologies have made full hand tracking widely available, in Virtual Reality (VR), in Augmented Reality (AR) and in Mixed Reality (MR). Virtual Reality is a 3D immersive environment which may be defined as an artificial environment that is created with software and presented to the user in such a way that the user suspends belief and accepts it as a real environment. In Virtual Reality (VR), the users' perception of reality is completely based on virtual information. Augmented Reality (AR) and Mixed Reality (MR) differ from Virtual Reality (VR) in the sense that the 3D immersive environment is constituted by the surrounded environment which is actually real and by some layers of virtual objects added to the real environment. In Augmented Reality (AR) and Mixed Reality (MR), user is provided with additional computer generated information that enhances their perception of reality. On the other hand, in Virtual Reality (VR) the surrounding environment is completely virtual. A difference between Augmented Reality and Mixed Reality is that the user cannot interact directly with virtual objects in Augmented Reality (AR). In Mixed Reality, the additional computer generated information are "mixed" together to create a realistic environment. A user may navigate this environment and interact with both real and virtual objects.

For example, Augmented Reality (AR) has the capability to display a virtual 3D box on a physical table. With Mixed Reality (MR), the user might be able to pick up and open the box.

In the definitions of Virtual, Augmented and Mixed Reality, a real object is an object which exists physically in the environment world.

None of the existing CAD applications allows the creation of accurate 3D objects, in an immersive environment, using natural hand interactions.

Within this context, there is still a need for an improved method for selecting by use of hand gestures topological elements such as vertices of a 3D object in a 3D immersive environment of a CAD system.

SUMMARY

It is therefore provided a computer-implemented method for selecting a vertex among vertices of a 3D object in a 3D immersive environment of a CAD system. Each vertex has a position in the 3D immersive environment. The method comprises:

displaying the 3D object in the 3D immersive environment;

detecting a hand gesture comprising opposing the pads of the index finger and the thumb, both pads being spaced;

determining a segment parallel to a segment connecting the pads of the index finger and the thumb, the determined segment having a position in the 3D immersive environment; and identifying the vertex of the 3D object having the closest position with the determined segment.

The method may comprise one or more of the following:

the identifying further comprises casting a ray from the determined parallel segment parallel to the center of the 3D object;

each vertex of the 3D object further has a normal and the opposed pads of the finger and the thumb further form an oriented plane with a normal, and wherein the identifying further comprises:

minimizing a function $f$:

$$f(\text{Vertex}) = w_1 * \|FH\| + w_2 * \widehat{FH}$$

wherein:

Vertex is the vertex of interest;

$\{w_1 \in \mathbb{R} \,|\, w_1 \geq 0\}$ and $\{w_2 \in \mathbb{R} \,|\, w_2 \geq 0\}$ and $\{w_1 + w_2 > 0\}$;

$\|FH\|$ is an Euclidian distance in the 3D immersive environment between the position of the vertex Vertex and the position H of the oriented plane; and $\widehat{FH}$ is an angle in the 3D immersive environment between the normal of the vertex Vertex and the normal of the oriented plane.

the term $\|FH\|$ of the function $f$ is replaced by $\|FH'\|$ with H' being computed by:

$$H' = E + EH * \max(1, a * (\|EO_{max}\|) / \|EH_{max}\|)$$

wherein:

H' is the position of an oriented plane of a virtual hand;

E is the position of the user's point of view;

H is the position of the oriented plane formed by the opposed pads of the finger and the thumb;

EH is a vector from E to H;

Omax is the position of the furthest vertex of the 3D object from E;

Hmax is the furthest position of the center of the user's hand from E in a transverse plane of the user's body;

$\{a \in \mathbb{R}^*\}$;

$\|EO_{max}\|$ is the norm of the vector from E to Omax; and $\|EH_{max}\|$ is the norm of the vector from E to Hmax.

the term $\|FH\|$ or $\|FH'\|$ of the function $f$ further comprises the Euclidean distance in the 3D immersive environment between the position of the vertex and at least one intersection of the 3D model with a ray being cast from the center of the head or the dominant eye or the point between the eyes to the center of the 3D model;

the identifying comprises determining the vertex of the 3D object having the closest position with the determined segment, computing one or more n-neighboring vertices of the determined vertex, the one or more neighbor vertices and the determined vertex forming a subset of selectable vertices, and identifying the vertex of the 3D object having the closest orientation with the oriented plane from the subset of selectable vertices;

modifying a first rendering of the vertices of subset of selectable vertices;

modifying a second rendering of the identified vertex;

the vertices of the 3D objects may be part of triangles and/or part of quadrangles and/or part of topological faces and/or part of parametric surfaces and/or part of procedural surfaces;

detecting the hand gesture comprises opposing the pads of the index finger and the thumb, the index finger and the thumb being substantially parallel;

selecting the identified vertex of the 3D object by detecting that the hand gesture further comprises a contact between the pads of the index and the thumb;

detecting that the hand gesture further comprises an abduction of all fingers, and deselecting the selected vertex.

It is further provided a computer program comprising instructions for performing the method.

It is further provided a system comprising a display and a processing circuitry communicatively coupled with memory, the memory storing the computer program.

It is further provided a computer readable medium having recorded thereon the computer program.

BRIEF DESCRIPTION OF THE DRAWINGS

Embodiments will now be described, by way of non-limiting example, and in reference to the accompanying drawings, where.

DETAILED DESCRIPTION

Figure 1:
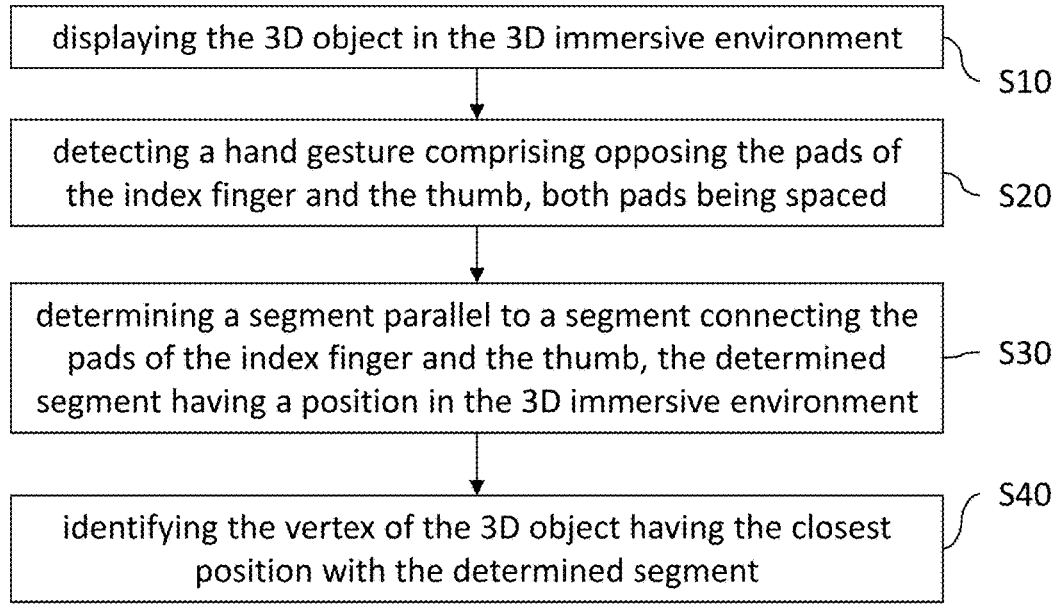
FIG. 1 shows an example of a flowchart of the method.

With reference to the flowchart of FIG. 1, it is described a computer-implemented method for selecting a vertex among vertices of a 3D object in a 3D immersive environment of a CAD system. Each vertex has a position in the 3D immersive environment. The method comprises displaying the 3D object in the 3D immersive environment. Then, a hand gesture is detected. The hand gesture comprises opposing the pads of the index finger and the thumb, both pads being spaced. The index finger and the thumb are thus in a position ready for finger pinch. Then, the method also comprises determining a segment parallel to a segment connecting the pads of the index finger and the thumb. The determined parallel segment has a position in the 3D immersive environment. Next, the method comprises identifying the vertex of the 3D object having the closest position with the determined segment.

This constitutes an improved method for selecting a vertex among vertices of a 3D object in a 3D immersive environment of a CAD system using hand interactions. Notably, the method solves the problem of the ambiguity about which element users want to select. As explained above, in CAD applications, 3D objects contain many small elements. Selecting an element might be difficult with a mouse-based approach because of the size of the element or of the size of the visible surface of the element from the user's point of view. Indeed, if the size is small, with a mouse-based approach a user needs either to move their mouse really precisely and/or to zoom-in and/or to change the point of view of the 3D scene. The method presented here solves this drawback. Indeed, the method is using the respective positions of the vertices and the position of a segment computed from opposing the pads of the index finger and the thumb during the hand gesture to determine which element the user wants to select. The gesture produces a segment whose length depends on the user: the user can modulate the length of the segment for selecting an vertex having the closest position. Elements of a 3D object may be differentiated and therefore selected by the user with the method. In addition, opposing the thumb and index pads is a very simple and basic gesture that can be easily performed by the user.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

For example, the detecting S20 and the determining S30 partially depend on a user action. The detecting S20 is performed as a result of a user action that comprises a user hand gesture with an opposing the pads of the index finger and the thumb. The determining S30 is performed as a result of a user action that comprises a user hand gesture where a segment is created with a position used for identifying an element the user wants to select.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

Figure 3:
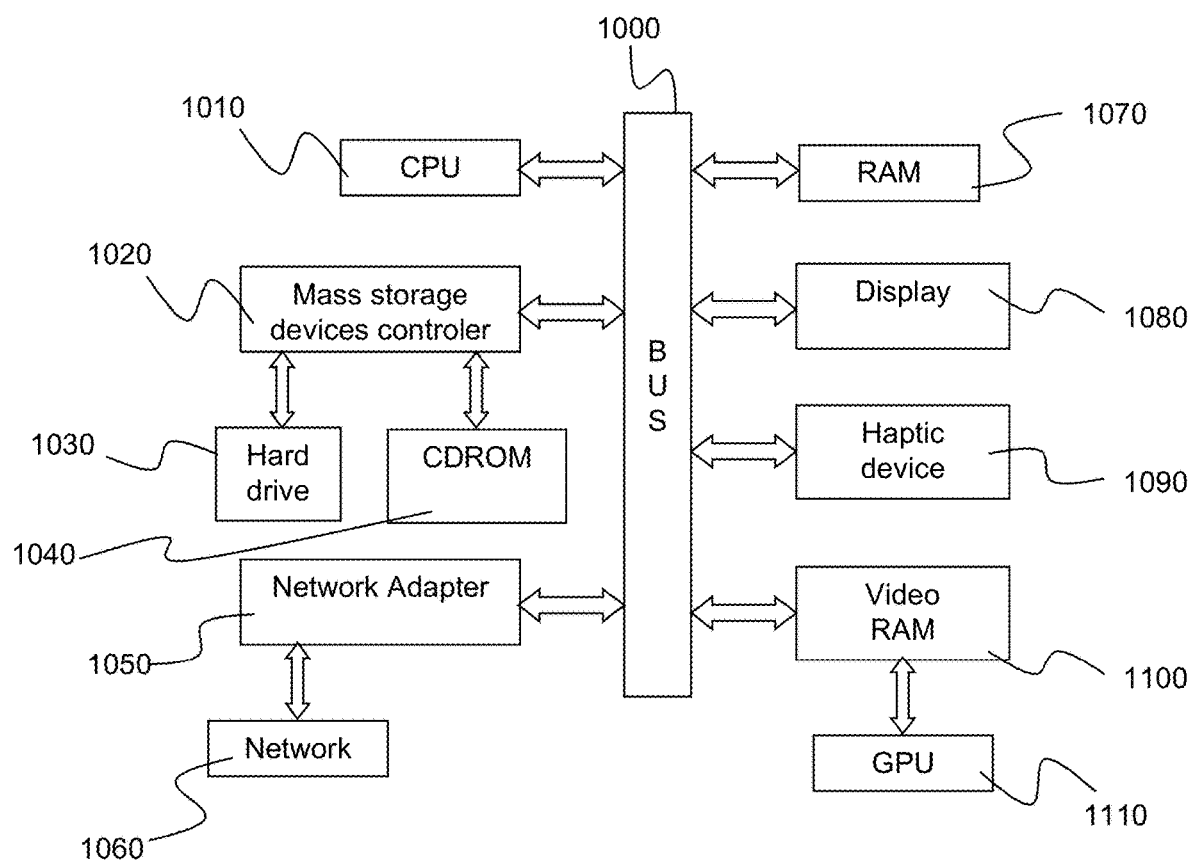
FIG. 3 shows an example of the system.

FIG. 3 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The method manipulates 3D objects. Hereafter, any reference to a 3D object will refer to a digitally modeled 3D object, and not to a physical one. A digitally modeled 3D object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. A 3D modeled object herein may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

A 3D object may be composed of at least one the following three types of topological entities: face, edge, and vertex. By definition, a face is a bounded portion of a surface. An edge is a bounded portion of a curve. A vertex is a point in 3D space. They are related to each other as follows. The bounded portion of a curve is defined by two points (the vertices) lying on the curve. The bounded portion of a surface is defined by its boundary, this boundary being a set of edges lying on the surface. Edges of the face's boundary are connected by sharing vertices. Faces are connected by sharing edges. Two faces are adjacent if they share an edge. Similarly, two edges are adjacent if they share a vertex. All edges of a face may be lying on a same plane or not. A normal of a face may be calculated by taking the vector cross product of two edges of that face. If not all edges of a face are lying on a same plane, it is worth noting that various normal may be computed depending on the edges chosen to calculate the cross product. A normal of a vertex may be provided and/or calculated. The normal of a face or vertex may also be edited. For example, in case of a face having all edges not lying on a same plane, the normal is often edited. The normal gives the direction of the face. In other words, the normal determines the front side and the backside of a face. Traditionally, for a 3D object, the normal of its vertices is directed towards the outside of the 3D object. The normal of the vertices may be deducted from the normal of the faces they belong to. A vertex generally belongs to at least 3 faces, that is, the vertex is shared with at least three edges of respective at least three faces.

From now on, we assume all orientations, directions and positions are computed in the 3D immersive environment's reference frame.

The 3D object may also be defined using edges or lines, surfaces, vertices. Lines, edges, or surfaces may be represented in various manners, e.g. non-uniform rational B-splines (NURBS). These edges, lines, and/or surfaces may be used as inputs from which a geometry of the 3D object may be generated, which in turn allows for a representation of the 3D object to be generated. The method described here may be used on a 3D object based on non-uniform rational B-splines (NURBS) lines, edges and surfaces as they comprise vertices that a user may want to select. More generally, surfaces may also be parametric and/or procedural surfaces, these surface comprising vertices. A parametric surface is a surface in the Euclidean space $\mathbb{R}^3$ which is defined by a parametric equation with two parameters $\vec{r}: \mathbb{R}^2 \to \mathbb{R}^3$. A procedural surface is a surface which is defined as a procedure. A subdivision surface may be considered as a procedural surface. A subdivision surface is a method of representing a smooth surface via the specification of a coarser piecewise linear polygon mesh.

The 3D object may be computed from a cloud of points obtained from a laser scan of a mock-up. Such a cloud of points is typically made of disconnected vertices, but may also comprise interconnected edges that represent the shape of digitalized mock-up.

The 3D object may be a wireframe 3D object. The wireframe may be obtained from a cloud of points, or designed by a user.

Referring now to FIG. 1, the method displays S10 at least one 3D object in a 3D immersive environment. If there are more than one 3D object displayed in the 3D immersive environment, there is one 3D object identified as a 3D object of interest. From now on, the 3D object of interest is referred to as the 3D object.

As defined above, a 3D immersive environment may be used in Virtual, Augmented or Mixed Reality. This 3D immersive environment has a reference frame. All objects, and all their topological elements, in this 3D immersive environment may therefore be located relatively to this reference frame. The method may then be used in Virtual, Augmented and Mixed Reality to select a vertex of any of the 3D objects of a 3D immersive environment. The method could also be used in any other Reality comprising an environment with a reference frame allowing the localization of at least one 3D object.

Then, a hand gesture is detected S20. The hand gesture comprises opposing the pads of the index finger and the thumb. Each pad has a substantially flat surface; pads are opposite each other when they are substantially parallel each other. The pads of the index finger and the thumb are not in contact so that there is a space between both pads. The space is chosen by the user. Preferably, the space between both pads is larger than 1 centimeter. In other words, the gesture can be seen as forming an open wrench with the index finger and the thumb.

The user's interactions with the 3D immersive environment may be done by tracking a position and an orientation of a part of the body of the user, or by tracking respective positions and orientations of several parts of the user's body, or even tracking positions and orientations of the complete user's body.

In examples, parts of the user's body are the hand(s) of the user.

Hand tracking provides direct and natural interactions and improves the immersive experience. Indeed the user does not need to use specific Virtual, Mixed or Augmented Reality hand controllers. Traditionally, to interact with a 3D object in a 3D immersive environment, a method comprises clicking on a button of the specific controller after pointing at the 3D object with a virtual 3D line.

Figure 10:
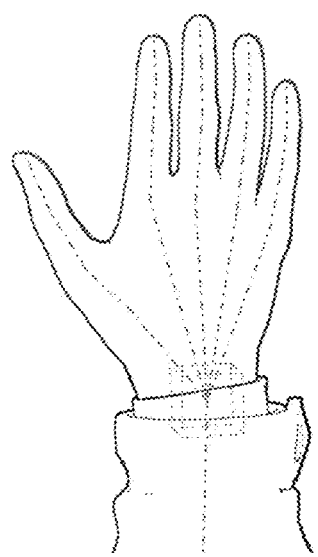
FIG. 10 shows an example of virtual skeleton.

Hand tracking allows a detection of specific postures or gestures of a hand. For example, hand tracking of specific postures may be done with a video recorder or with gloves and hand tracking of specific gestures may be done with accelerometers. The method may be used with the right or the left hand of the user. A posture is a pose using a part of the body and a gesture here may be defined as a movement allowing a part to modify its posture. In other words, a second posture may be seen as the result of a gesture started from a first posture. Therefore detecting a gesture may be done by detecting a second posture and comparing this second posture with a first posture. If the detected second posture is the same as the first posture, no gesture happened. If the detected posture is different from the first posture, the gesture may be defined as the difference between the second posture and the first posture. More generally, a gesture may be defined as a change of posture triggered by a change of position and/or orientation of a part of the user's body, e.g. the user's hand. For example, in the method, detecting a hand gesture could consist of computing a difference of the current posture from the default posture. In this example, the default posture corresponds to the first posture and the current posture to the second posture. The difference may be inferred with a change of position and/or orientation of the user's hand. It is worth noting that hand tracking of specific postures is performed with devices capturing a posture at a high framerate, for example at least 10 frames per second, therefore the risk of not detecting a motion involving a motion from a first posture to a first posture with an intermediate second posture is really low. The default posture could be any posture allowing the detection of opposing the pads of the index finger and the thumb, both pads being spaced by a minimum distance. An example of a default posture for a right hand is shown in FIG. 10. This default posture is an example of a common posture for a resting right hand. In other words, the default posture is an example of a posture for a right hand in which all muscles are relaxed. A default posture could also be defined as any posture, which will not be detected as a specific posture used in any step of the method.

The detection of a gesture may be done in various ways. In an example, gestures may be detected by mathematical comparison of the relative positions and/or orientations of various parts of the body, with some tolerance to take into account morphological variations. Note that a calibration phase might be required for the system to adjust to the morphology of the user. In another example, gestures may also be detected using machine learning techniques, by training a neural network to distinguish the different possible gestures.

In examples, kinematic parameters of the gesture of the hand may be provided through a virtual skeleton as shown for example in FIG. 10. A virtual skeleton comprises one or more joints and one or more bones. This virtual skeleton does not need to replicate a real skeleton. In other words, there might be no correspondence between the joints and the bones of the virtual skeleton with the joints and the bones of the real skeleton. For example, the virtual skeleton of a hand might have less or more joints than the real skeleton of a hand. Furthermore, even if each joint of the virtual skeleton corresponds to a joint of the real skeleton, their position and orientation might vary. By using the linear and angular speed, position and orientation of the joints of the virtual skeleton, it is possible to detect a gesture or a posture of the real skeleton. For the sake of simplicity, from now on we will consider that the virtual skeleton replicates the real skeleton of the hand.

It is worth noting that the method of the disclosure is independent of the detecting method used to detect the various postures described. Hence, any technology able to detect a change of posture (e.g. a change of position and/or orientation of a part of the user's body), based or not on a virtual skeleton, may be used.

Figure 4:
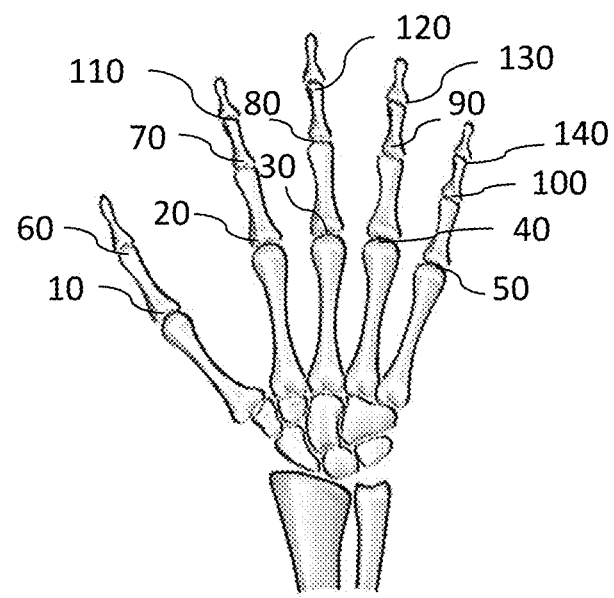
FIG. 4 shows an example of a posteroanterior view of a skeleton of a right hand in a default posture.

An example of real skeleton of a hand is shown in FIG. 4. A hand contains five fingers, which are traditionally called: thumb, index finger, middle finger, ring finger and little finger. The thumb is composed of the metacarpophalangeal 10 and interphalangeal 60 joints. The index finger is composed of the metacarpophalangeal 20, proximal interphalangeal 70 and distal interphalangeal 110 joints. The middle finger is composed of the metacarpophalangeal 30, proximal interphalangeal 80 and distal interphalangeal 120 joints. The ring finger is composed of the metacarpophalangeal 40, proximal interphalangeal 90 and distal interphalangeal 130 joints. The little finger is composed of the metacarpophalangeal 50, proximal interphalangeal 100 and distal interphalangeal 140 joints. The rest of the hand may be divided in three areas. A first area is the palm, which is the central region of the anterior part of the hand. A second area is the back of the hand, which is the corresponding area of the palm on the posterior part of the hand. A third area is the heel of the hand located in the proximal part of the palm.

Figure 5:
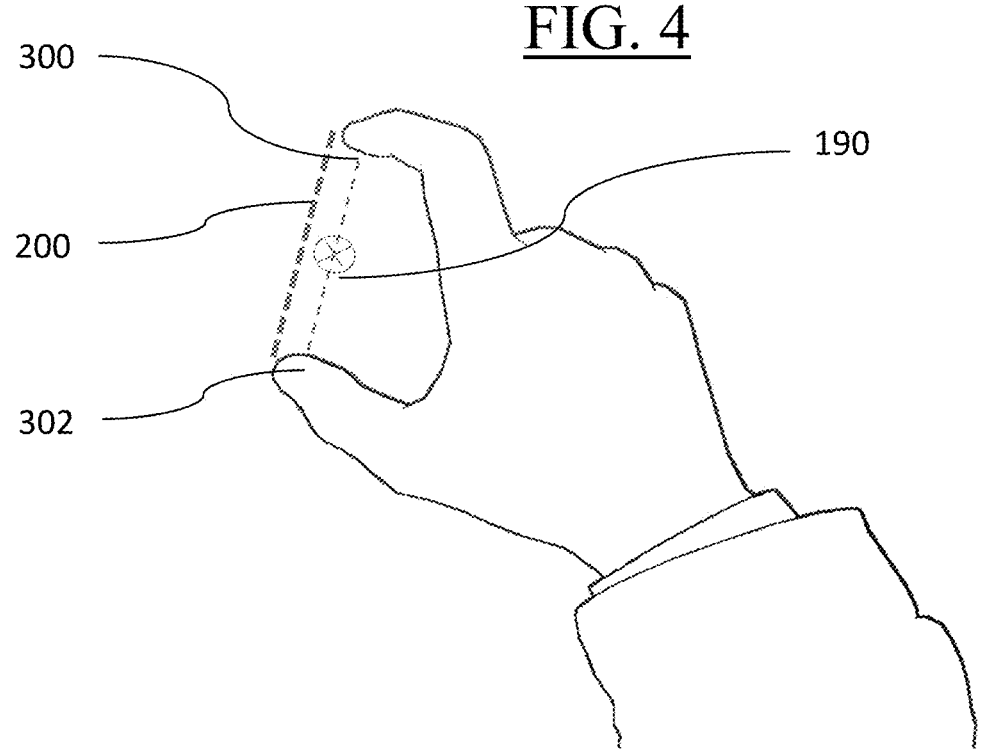
FIG. 5 shows an example of the detected gesture.

Opposing the pads of the index finger and the thumb is the gesture preparing the action of pinch gripping an object (e.g. a vertex element of the 3D model) between the index finger and the thumb. As shown in the example of FIG. 5, the pad 300 of the index finger and the pad 302 of the thumb are facing, but are not in contact. They are spaced by a distance chosen by the user. The distance is represented by a segment 200 connecting the fingertips of the index finger and the thumb. Still in reference to FIG. 5, the index finger performs a flexion. For instance, a flexure may be performed by the proximal interphalangeal joints 70, the distal interphalangeal joint being 110 not or almost not in flexion. This allows the distal and intermediate phalanges of the index finger to be substantially in line, thus making easier the detection of the gesture. The thumb may be slightly in extension so that the distal and intermediate phalanges of the thumb are also substantially in line. Thus, as shown on FIG. 5, the distal and intermediate phalanges of the index finger and the thumb are substantially in parallel when opposing the pads of the index finger and the thumb; therefore, the pads of the index finger and the thumb are also substantially parallel.

Referring back to FIG. 1, after detecting S20 a hand gesture comprising opposing the pads of the index finger and the thumb, the method comprises determining S30 a segment parallel to a segment connecting the pads of the index finger and the thumb. The segment connecting the pads of the index finger and the thumb may connect the center of the pads of the index finger and the thumb.

In examples, the computing of the segment that is parallel to the segment connecting the pads is carried out by determining a segment that joins the fingertips. This is easier to perform compared to the detection of a segment that would connect the center of the pads of the index and thumb. The computation of the segment connecting both tips may be carried out using a virtual skeleton of the user's hand. The determined parallel segment has a position in the 3D space. This means that each point on the segment has a position in 3D space, e.g. the two endpoints of the segment. Thus, in these examples, S30 comprises determining a line or a segment that connects the fingertip of the index finger with the fingertip of the thumb, and then computing from this line or segment a segment that connects the pad of the index finger with the pad of the thumb or that connects the center of the pad of the index finger with the center of the pad of the thumb.

In examples, the parallel segment comprises the segment that connects the pads of the index finger and the thumb. The segment may connect the center of the pad of the index finger and the center of the pad of the thumb. In these examples, the segment that connects the (centers of the) pad of the index finger and (centers of the) pad of the thumb is determined directly. Thus, in these examples, S30 comprises determining a segment connecting the pad of the index finger and the pad of the thumb, or determining a segment connecting the center of the pad of the index finger and the center of the pad of the thumb.

Determining S30 may also be done without any virtual skeleton. As an example, determining S30 may be based on a neural network trained to determine S30 from a video recorder.

Then, the method further comprises identifying S40 the vertex of the 3D object having the closest position with the determined parallel segment. The closest position is determined by comparing the position of each vertex of the 3D model with the position of the parallel segment. For each vertex of the 3D model, a distance is thus computed between the position of the said each vertex and the parallel segment. The distance may be a Euclidian distance.

In examples, a point is selected on the parallel segment for identifying the vertex having the closest position. This improves the determination of the closest position in term of use of computing resources as fewer distances have to be computed.

In examples, the point on the parallel segment is located in the middle of the parallel segment (that is, in the center of the parallel segment). This particular location improves ergonomics and interactions for the user as they can more easily adapt the position of the hand and/or the space between the two pads for selecting the vertex of interest. The gap between the two pads may be used as a sight: vertices in the sight (from a user perspective) are selectable.

In examples of the present disclosure, the identifying S40 may be done iteratively by considering each vertex of the 3D object. It is to be understood that only a subset of vertices of the 3D object may be used when determining the vertex of the 3D object having the closest position with the parallel segment. For instance, only the vertices reachable by the user's hand and visible to the user might be used.

In examples, the identifying may be performed by casting a ray from the determined parallel segment parallel to the center of the 3D object. Here the expression "from the determined parallel segment parallel to the center of the 3D object" means that the ray passes through the parallel segment before reaching the 3D model; the ray does not necessarily start from the parallel segment. In examples, the ray passes through the middle of the parallel segment.

In examples, the ray may be cast from the center of the head of the user or the dominant eye of the user or the point between the eyes of the user. This makes easier the selection of the user as there is an improved match between what the vertices the user sees between the index finger and the thumb and the vertex going to be selected by the method.

In examples, each vertex of the 3D object may have a normal and the opposed pads of the finger and the thumb may form an oriented plane with a normal. The normals of the vertices may be computed if the vertices of the 3D model are devoid of normals, as previously discussed. If a computation is performed, it may take place at any step of the method, preferably before the identifying S40. The opposed pads of the finger and the thumb may form a plane that is oriented with a normal. The determination of the plane may be performed at step S20, S30 or S40. The oriented plane is determined based on the position of the index finger and the thumb when their pads are opposed. Indeed, as already discussed, when the pads of the index finger and the thumb are opposed, the distal and intermediate phalanges of the index finger and the thumb are substantially in line, and a plane that comprises these two lines may be formed. Furthermore, the plane may comprise the parallel segment. Therefore, it is possible to consider that a plane is formed when opposing distal and intermediate phalanges of the index finger and the thumb. The so-formed plane must be oriented, and a normal of the plane is added. The orientation of the plane is arbitrary, e.g. it may be chose by the user.

Figure 6:
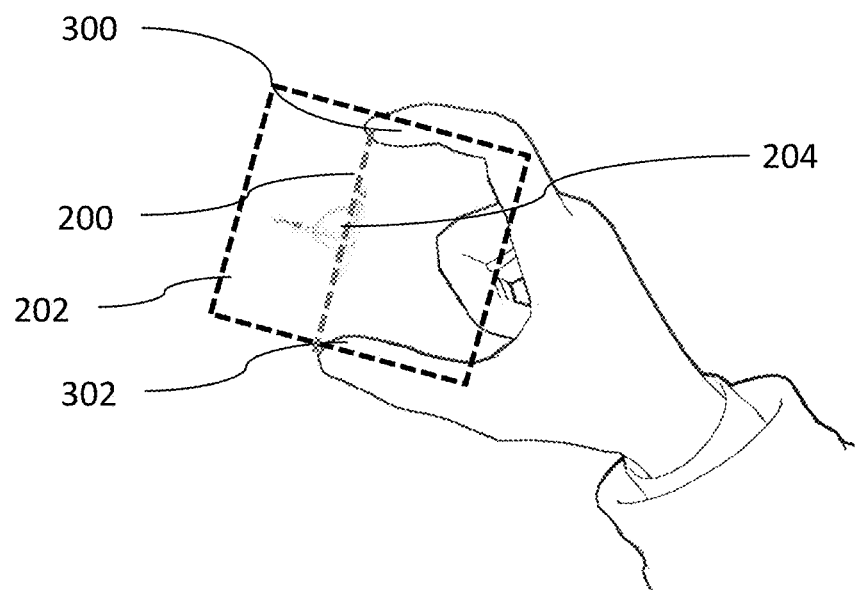
FIG. 6 shows an example of a virtual plane generated from the detected gesture.

It is now discussed FIG. 6. FIG. 6 shows an example of a plane formed by opposing the pad of the index finger and the pad of the thumb. The distal and the intermediate phalanges of the index finger are substantially in line, and the same goes for the distal and intermediate phalanges of the thumb. In addition, the intermediate phalanges of the index finger and thumb are substantially parallel so that the distal and intermediate phalanges of the index finger and thumb form a support for a plane 202. The parallel segment 200 belongs to the plane 202, as represented on FIG. 6. The plane 202 is oriented and a graphical cue 204 may be displayed for indicating to the user the normal of the plane 202. The plane 202 may be displayed or not, preferably it is not displayed in order to keep the gesture as natural as possible, e.g. the user is not disturbed by a representation of the plane; eye strain is decreased during the method. Therefore, the hand is associated with a plane formed by opposing the pad of the index finger and the pad of the thumb. This will be referred to as oriented plane of the hand from now on.

In examples, the plane may be derived from a triangle formed by three points: (i) two points formed by the tips or the pads or the center of the pads of the index finger and the thumb, and (ii) one point formed by the joint between index and thumb metacarpal bones, or one point formed by the intersection of the lines defined by these bones, or by the wrist. In these examples, the parallel segment may be belong to the plane.

In the examples wherein each vertex of the 3D object further has a normal and the opposed pads of the finger and the thumb further form an oriented plane with a normal, the identifying S40 may comprise identifying the vertex among vertices, which minimizes a function noted $f$ computed with the following equation (1):

$$f(\text{Vertex}) = w_1 * \|FH\| + w_2 * \widehat{FH} \qquad (1)$$

wherein:
Vertex is the vertex of interest;
$\{w_1 \in \mathbb{R} \,|\, w_1 \geq 0\}$ and $\{w_2 \in \mathbb{R} \,|\, w_2 \geq 0\}$ and $\{w_1 + w_2 > 0\}$;
$\|FH\|$ is an Euclidian distance in the 3D immersive environment between the position of the vertex Vertex and the position H of the oriented plane; and $\widehat{FH}$ is an angle in the 3D immersive environment between the normal of the vertex Vertex and the normal of the oriented plane.

The function $f$ is a weighted sum of two terms. Indeed, the first term $\|FH\|$ is multiplied by a factor $w_1$ and the second term $\widehat{FH}$ is multiplied by a factor $w_2$.

The first weighted term $\|FH\|$ is the Euclidian distance in the 3D immersive environment between the position of the vertex Vertex and the position H of the oriented plane formed by the index finger and the thumb when their pads are opposed. The position the position H of the oriented plane may be the position of the parallel segment, e.g. the center of the parallel segment.

The second weighted term $\widehat{FH}$ is the angle between the normal vector of the vertex Vertex and the normal vector of the oriented plane. The second weighted term could also be based on the orientation of the vertex Vertex and the orientation of the oriented plane formed by opposing the pads of the index finger and the thumb.

Each weight $w_1$ and $w_2$ may be equal or superior to 0. The sum of the two weights is strictly superior to 0. If one of the weight is equal to 0, it means only one of the two terms is considered in the function. As an example, $w_1$ may be set between 0.1 and 0.5 and $w_2$ may be set between 0.5 and 0.9.

The weights $w_1$ and $w_2$ may be precomputed. For example, they may be precomputed based on the number and the size of the vertices of the 3D object. The weights $w_1$ and $w_2$ may, for example, be precomputed at the loading of the 3D immersive environment containing the 3D object. If the 3D object has many vertices, the weight of the second term might be larger than the weight of the first term. The weights may also depend of the devices used. For example, some devices might give a limited precision for the position of the hands but a better precision for the orientation. The weights may also vary during the method. For example, the weights may vary depending on the number and the size of the vertices of the 3D object of the surfaces of the 3D object located in the field of view of the user. The field of view may be defined as the extent of the observable environment at a given time. Therefore, because the field of view might vary during the method, the weights $w_1$ and $w_2$ may also vary.

In an example, the identifying S40 may be done iteratively by considering each vertex of the 3D object. In another example, the identifying S40 may be done iteratively by considering each vertex of a subset of the 3D object. For each vertex, the result of the function $f$ is computed. The vertex having the smallest value is the vertex of the 3D object minimizing the function $f$.

In examples, the term |FH| of the function $f$ may be replaced by the term II. H' is computed using the equation (2) by:

$$H'=E+EH^*\max(1, a^*(\|EO_{max}\|)/\|EH_{max}\|) \quad (2)$$

wherein:
H' is the computed position of the center of a virtual hand;
E is the position of the user's point of view;
H is the position of the center of the user's hand;
EH is a vector from E to H;
Omax is the position of the furthest vertex of the 3D object from E;
Hmax is the furthest position of the center of the user's hand from E in a transverse plane of the user's body;
$\{a \in \mathbb{R} \,|\, a \geq 1\}$;
$\|EO_{max}\|$ is the norm of the vector from E to Omax; and
$\|EH_{max}\|$ is the norm of the vector from E to Hmax;

H' is the computed position of the oriented plane of a virtual hand. The oriented plane of the virtual hand may be obtained as discussed hereinabove: the virtual hand comprises a virtual plane that is obtained from opposed pads of the virtual finger and the virtual thumb of the virtual hand. The virtual hand thus reproduces (or mimics) the gesture performed by the user. The virtual hand may be defined as the hand virtually located at least further than the user's hand from the user's point of view E in the 3D immersive environment. Using a virtual hand is useful in order to ensure the term $\|FH\|$ is always pertinent regarding the distance of the vertices from the user's point of view. The virtual hand may not be closer from the user's point of view E than the user's hand. The user's point of view E may be for example situated at the center of their head or at their dominant eye or the middle of their eyes. Omax is the position of the furthest vertex of the 3D object from the user's point of view E. As an example, the considered vertex as the furthest vertex of the 3D object from the user's point of view E may be determined at the beginning of the method, for example at the beginning of the detecting S20. As an example, the considered vertex as the furthest vertex of the 3D object from the user's point of view E may also be updated all along the method. Updating the considered vertex as the furthest vertex of the 3D object from the user's point of view E is especially useful if the user's point of view E and/or the 3D object moves during the method. In other words, as an example, Omax may be determined during the detecting S20 and may be updated during all along the method. Hmax is the furthest position of the oriented plane of the user's hand from the user's point of view E in a transverse plane of the user's body. Therefore Hmax is an indicator of whether or not a vertex is selectable by using the method considering the vertex's distance from the user's point of view E. Hmax is for example the position of the oriented plane of the user's hand when the user's arm is stretched out horizontally in front of them. Hmax may be precomputed for example during a calibration phase. Hmax may also be set by the user. a is used as a factor of $\|EO_{max}\|/\|EH_{max}\|$. a is for example set by the user before using the method. If a=1, it means the virtual hand will be further than the user's hand in the 3D immersive environment when the distance between the furthest vertex of the 3D object from the user's point of view E is greater than the furthest position of the oriented plane of the user's hand from the user's point of view E in a transverse plane of the user's body. Using a greater value than 1 for a will allow the user to select the furthest vertex of the 3D object from the user's point of view E without having to stretch entirely their arm. As an example, a value of a may be set between 1.5 and 2. For the sake of simplicity, we will consider below that a=1.

Using a virtual hand improves the user's interactions with the 3D object (and more generally in the 3D environment). Examples of FIGS. 8 and 9 illustrate improvements in ergonomics with the use of the virtual hand.

Figure 8:
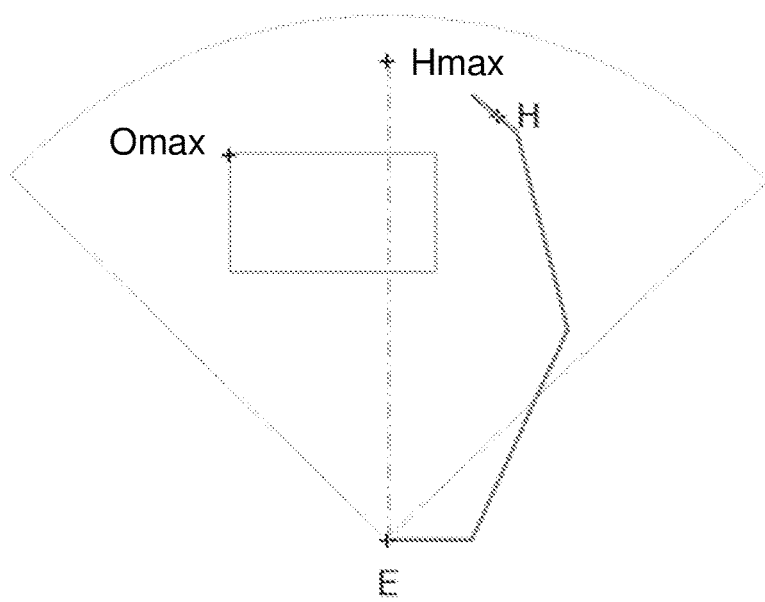
FIGS. 8 and 9 show examples of using a virtual hand.

In the example of FIG. 8, using a virtual hand may allow a user to select any vertex of the 3D object without having to stretch entirely their arm. Maintaining an arm stretch may be tiring for the user, therefore using a virtual hand solves this problem.

Figure 9:
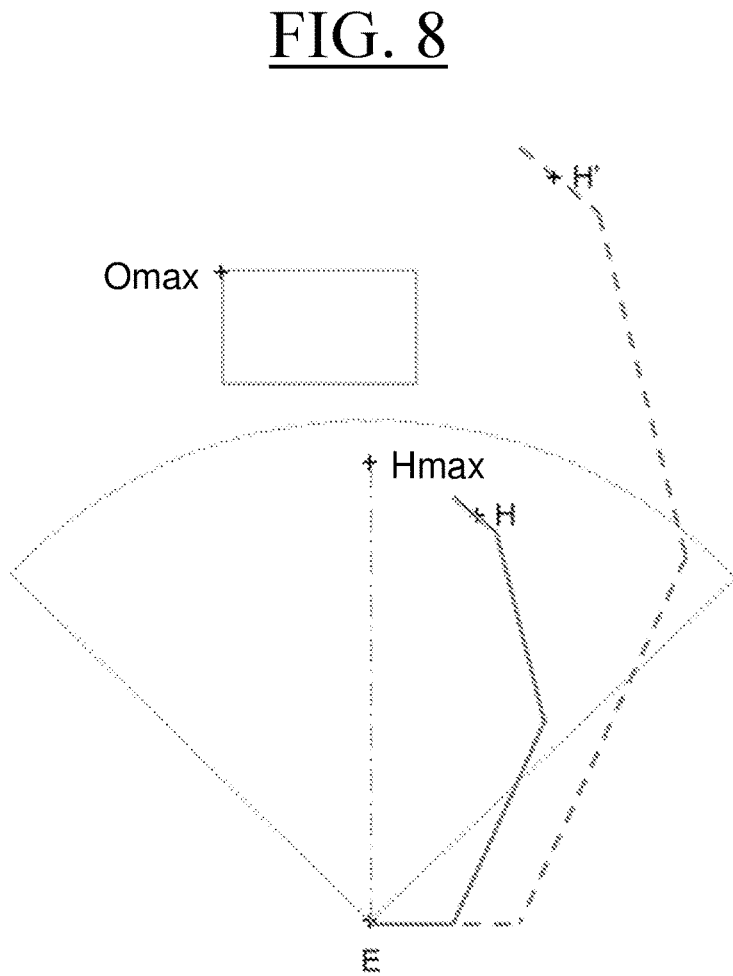

In the example of FIG. 9, using a virtual hand allows the user to select any vertex of the 3D object without moving the user's point of view E. Indeed, as an example, when the distance between the furthest vertex of the 3D object and the user's point of view E is greater than the distance between the furthest position of the center of the user's hand from E in a transverse plane of the user's body, some vertices of the 3D object may not be selectable without using a virtual hand. In this case, the virtual hand is positioned further from the user's point of view E than the user's hand. Without using the virtual hand, the term $\|FH\|$ would penalize the selection of the furthest vertex of the 3D object from the user's point of view E. The method would therefore be biased by this term. The virtual hand solves this problem by virtually moving the position of the user's hand in the 3D immersive environment in order to ensure the virtual H' may always be at least as far as the furthest vertex of the 3D object with both positions considered from the user's point of view E.

In an example, using the virtual hand may be combined with a ray cast sent from the virtual hand. This combination may be activated for example if the user's hand is really close to the user's head. The direction of the ray may be orthogonal to the oriented plane of the virtual hand toward the center of the 3D object. The oriented plane of the virtual hand being obtained from virtual opposed pads of the index finger and the thumb, the ray may be preferably cast from a virtual parallel segment that is obtained from a segment connecting the tips of the index finger and the thumb of the virtual hand that reproduces the gesture of the user's hand. This combination may be, for example really useful in Mixed or Augmented Reality to select any vertex of a 3D object which may be surrounded by real obstacles. Using the direction of the ray cast to select a vertex among vertices of a 3D object is particularly useful to select a vertex situated at the back of the object from the user's viewpoint. As an example, the direction of the oriented plane—obtained from virtual opposed pads of the index finger and the thumb—of the virtual hand may be used during the identifying S40. Therefore, by turning the palm of their hand towards their head, the method allows them to select a vertex situated at the back of the object from the user's viewpoint.

In examples, the term ∥FH∥ or ∥FH'∥ of the function $f$ (respectively computed with equation (1) or equation (2)) may further comprise the Euclidean distance in the 3D immersive environment between the position of the vertex and at least one intersection of the 3D model with a ray being cast from the user's point of view E. The ray may be cast for example from the center of the head or the dominant eye or the point between the eyes to the center of the 3D model. The direction of the cast may be for example defined by the direction of the user's gaze or user's head. The direction of the cast may also be for example computed from the position of the user's point of view E to the position of the center of the 3D model. The center of the 3D model may be for example defined as the center of the bounding box of the 3D model. As an example, the direction of the cast is calculated from the position of the user's point of view E to the position of the center of the 3D model. The ray cast passes through the virtual parallel segment that is obtained from a segment connecting the tips of the (virtual) index finger and the (virtual) thumb of the virtual hand that reproduces the gesture of the user's hand.

Adding a term based on the Euclidean distance in the 3D immersive environment between the position of the vertex and at least one intersection of the 3D model with a ray being cast from the user's point of view E to the term ∥FH∥ or ∥FH'∥ allows the method to be sensitive to the position of the user's point of view E. In other words, this allows to promote the selection of a vertex aligned with the line between the user's point of view E and the at least one intersection of the 3D model with the ray. This is especially useful if the 3D model is partially rendered outside the field of view. In this case, the method will penalize selection of vertices outside the field of view.

In order to retrieve the position and/or orientation of the user's head, a head tracking may be done by any technology able to detect a change of posture or a motion. As an example, there are headsets or glasses providing such information in Virtual, Mixed or Augmented Reality. In order to retrieve the direction and/or orientation of the user's gaze, eyes tracking technology may be used.

Figure 2:
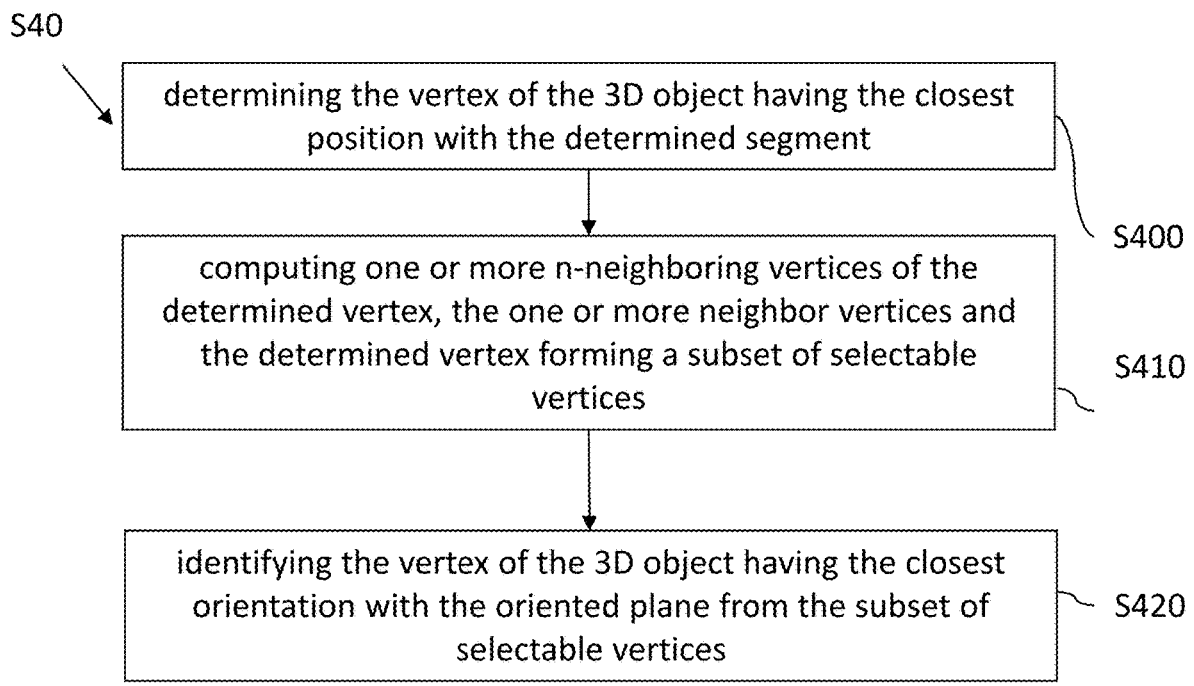
FIG. 2 shows an example of a flowchart of step S40 of the method.

In examples, with reference to the example of FIG. 2, the identifying S40 may further comprise determining S400 the vertex of the 3D object having the closest position with the determined segment. The identifying S40 may further comprise computing S410 one or more n-neighboring vertices of the determined vertex, the one or more neighbor vertices and the determined vertex forming a subset 230 of selectable vertices. A n-neighboring vertex of a determined vertex is a vertex sharing an edge with a n−1 neighboring vertex of the determined vertex and not sharing an edge with the n−2 neighboring vertex. Therefore, a 1-neighbouring vertex of a determined vertex is a vertex sharing an edge with the determined vertex and a 2-neighbouring vertex of a determined vertex is a vertex sharing an edge with a 1-neighbouring vertex of the determined vertex and not sharing an edge with the determined vertex. The identifying S40 further comprises identifying S420 the vertex of the 3D object having the closest orientation with the oriented plane from the subset of selectable vertices. n may be predetermined based on the size of the vertices of the 3D objects. n may also be updated based on the size of the vertices forming the subset or on the size of the visible surface from the user's point of view E of the vertices forming the subset and/or on the distance between the point of view of the user and the determined vertex. n may be also predetermined based on the device specifications or based on the user preferences.

The determining S400 and S420 may also be performed by determining the vertex of the 3D object having the closest direction or by determining the vertex minimizing the function $f$ of equations (1) or (2). All combinations between the determining S400 and S420 may be used. For example, the determining S400 may be done by determining the vertex of the 3D object having the closest direction and the determining S420 may be done by determining the vertex minimizing the function $f$.

In another example, the determining S400 and the determining S420 may be done by determining the vertex minimizing the function $f$. In this case, during the determining S400, the weight $w_1$ may be four times greater than $w_2$ and during the determining S420 the weight $w_1$ may be four times smaller than $w_2$.

In examples, the method may further comprise modifying a first rendering of the vertices of subset of selectable vertices. The subset of selectable vertices is computed during the step S410. As explained above, the subset is, for example, computed based on the determined vertex during the determining S40. The size of the subset depends on the value of n used in the computing S410. In an example, the value of n may be computed to ensure that the visible surface from the point of view of the user is always large enough for the user to easily identify it. Modifying the rendering of the subset helps the user to identify which vertices will be considered as selectable during the step S420. Therefore, if, the user will easily identify that the vertex of interest is not amongst this subset, and therefore modify their hand's position and/or orientation to change the subset during the step S410.

In an example, the user, after identifying the subset of selectable vertices, may modify their hand's position in order to change the subset of selectable vertices and/or they may modify their hand's orientation in order to change the identified vertex among the same subset of selectable vertices.

The modification of the rendering may be done in various ways. The modification of the rendering may be done during the computing S410 and/or identifying S420. As an example, the modification of the rendering may be performed by highlighting the selectable vertices. As another example, the modification of the rendering may be performed by applying a specific texture to the selectable vertices. The rendering may also be modified only for the edges of the selectable vertices. For example, the edges may be highlighted or thickened. In another example, the modification of the rendering may also comprise a zoom-in and a disconnection of the selectable vertices from the 3D object. The modification of the rendering may be completed by any another feedback to the user such as the automatic snapping of a graphical user information on the identified vertex. The modification of the rendering may also appear on top of the hands of the user by changing their representation. For example, the color of the hands could change, or lines may be overlaid on top of the fingers.

In examples, the method may further comprise modifying a second rendering of the identified vertex. The identified vertex may be, for example, the vertex identified during the step S40. Therefore, the modification of rendering of the identified vertex starts and helps the user to select the vertex of interest.

The identified vertex may also be, for example, the vertex identified during the step S420. The identified vertex may also be, for example, the vertex determined during the step S400. In these cases, for example, a second and a third rendering might be different than the first rendering of the subset of selectable vertices. The second rendering might also be different than the third rendering. The first and/or the second and/or the third renderings improve user interactions with the 3D object in the 3D environment: indeed, the user may more easily grasp during step S420 if they need to change their hand's position in order to change the subset of selectable vertices and/or they may modify their hand's orientation in order to change the identified vertex among the same subset of selectable vertices. Less user interactions are required in order to select the wanted vertex.

The modification of the rendering may be performed in various ways. In an example, the rendering may be performed by highlighting the selectable vertices. In another example, the rendering may be performed by applying a specific texture to the selectable vertices. The rendering may also be modified only for the edges of the selectable vertices, e.g. the edges may be highlighted or thickened. In another example, the modification of the rendering may also comprises a zoom-in and a disconnection of the selectable vertices from the 3D object. The modification of the rendering may be completed by any another feedback to the user such as the automatic snapping of a graphical user information on the identified vertex. The modification of the rendering may also appear on top of the hands of the user by changing their representation; e.g. the color of the hands could change, or lines could be overlaid on top of the fingers.

A good balance may be found between providing continuous user feedback and avoiding excessive popping. Providing continuous user feedback may be defined as having the method responsive to the user's input. In other words, for example, as soon as the user provides an input, the method should update with no visible delay, the result of the identifying S40 and/or the result of the determining S400 and/or the result of the computing S410 and/or the result of the identifying S420. By having the method responsive to the user's input, there is a risk that the method provides excessive popping. This term defines the tendency of a user interface to switch promptly and continuously between various states. In the method, it may be for example a prompt and quick switch between two or more vertices considered as the identified vertex.

As an example, the identified vertex with a modified rendering may be kept until a better candidate of the same dimension has been confidently identified. In other words, the identifying S40 may comprise minimizing the function $f$, the switching from a current identified vertex to another vertex will not be done as soon as the value of the function $f$ for the other vertex is smaller than the value of the function $f$ for the current identified vertex. To avoid excessive popping, a penalizing threshold or a penalizing factor may be used during the identifying S40 for the comparison of the value of the result of the function $f$ of the current identified vertex to another vertex. In other words, the identified vertex with a modified rendering may be kept until a better candidate of the same dimension is minimizing the function $f$, with an added penalizing threshold and/or multiplied by a penalizing factor to the result of the function $f$ of the candidate. Alternatively, an excessive popping may be avoided by switching from a current identified vertex to another vertex only after detecting that the user's hand is not moving for a certain amount of time.

The continuous user feedback may be done, for example, by a modification of the rendering of the 3D object and/or by adding virtual representations near the 3D object and/or near the hands user and/or by haptic feedback from the devices.

In examples, the vertices of the 3D objects in the method may be part of triangles and/or part of quadrangles and/or part of topological faces and/or part of parametric surfaces and/or part of procedural surfaces. A topological face is a group of neighboring triangles or a group of neighboring quadrangles, which form a larger "logical" continuous face while still potentially displaying a wide variety of different orientations between each primitive, especially when the topological face is large. In a CAD program, a topological face is most of the time bounded by topological edges, and therefore vertices of the topological edges. By neighboring triangles and/or neighboring quadrangles, it is to be understood that each triangle or quadrangle of the group is a 1-neighbouring triangle or quadrangle of a triangle or quadrangle of the said group. For example, a CAD object representing a car may be composed of few thousands triangles which may be grouped in less than one hundred topological vertices. For example, one topological vertex may represent the superior surface of the seat of the car.

In examples, the method further comprises selecting the identified vertex of the 3D object by detecting that the hand gesture further comprises a contact between the pads of the index and the thumb. In other words, the identified vertex of the 3D object is added to the current selection of vertices when the hand gesture further comprises a contact of the pad of the index finger with the pad of the thumb.

Figure 7:
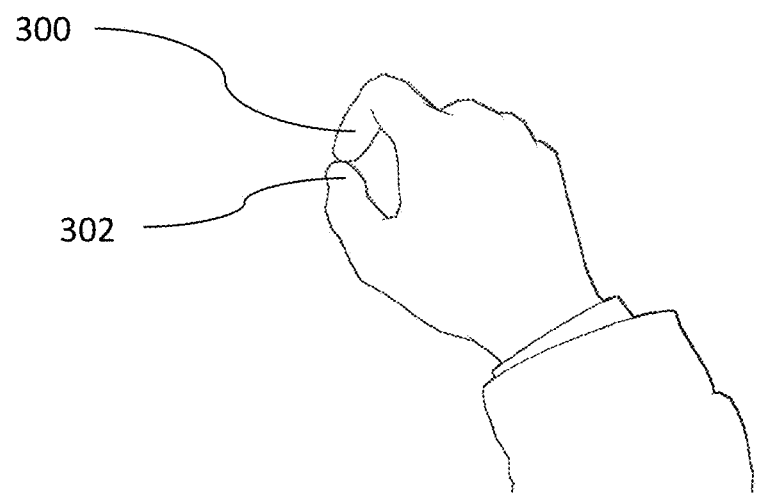
FIG. 7 shows an example of gesture for selecting a vertex.

In examples, the method further comprises selecting the identified vertex of the 3D object by detecting that the hand gesture further comprises a contact between the tips of the index and the thumb. An example of selection by detecting that the hand gesture further comprises a contact of the tips of the index finger and the thumb is shown in FIG. 7. In other words, the identified vertex of the 3D object is added to the current selection of vertices when the hand gesture further comprises a contact of the tip of the index finger with the tip of the thumb.

In examples, the method further comprises selecting the identified vertex of the 3D object by detecting that the hand gesture further comprises a distance between the pads of the index and the thumb that is smaller than a predetermined value, e.g. less or equal to 1 centimeter.

In examples, after the selection of a first vertex, the user may go back to a default gesture and/or performed again the gesture for selecting another vertex (a second vertex). The first selected vertex may be kept in memory so that the first and second vertices are stored in memory. By repeating the gesture, the user can select several vertices of the 3D model.

In examples, the method may further comprise detecting that the hand gesture further comprises an abduction of all fingers and deselecting the selected vertex. The detection may happen during any step of the method. As an example, the user may therefore deselect the last selected vertex. As another example, the user may deselect their entire current selection of vertices.

The size of the rendering of the vertex during preselection (that is, before the selection) may be inversely proportional to the distance between the thumb and the index, thus improving the ergonomics for the user.

The user can preselect several vertices (the current selection of vertices) and perform a selection of all the preselected vertices.

The term "center of" in this description may be interpreted as meaning "substantially in the center of".

The invention claimed is:

1. A computer-implemented method for selecting a vertex among vertices of a 3D object in a 3D immersive environment of a CAD system, each vertex having a position in the 3D immersive environment, comprising:
   displaying the 3D object in the 3D immersive environment;
   detecting a hand gesture including opposed pads of an index finger and thumb, both pads being spaced;
   determining a segment parallel to a segment connecting the pads of the index finger and the thumb, the determined segment having a position in the 3D immersive environment, the determined segment being created as a result of the detected hand gesture; and
   identifying the vertex of the 3D object having a closest position with the determined segment,
   wherein each vertex of the 3D object further has a normal and the opposed pads of the index finger and the thumb further form an oriented plane with a normal, and wherein the identifying further comprises:
   minimizing a function $f$:

$$f(\text{Vertex}) = w1 * \|FH\| + w2 * \widehat{FH}$$

wherein:
   Vertex is the vertex of interest;
   $\{w1 \in \mathbb{R} \mid w1 \geq 0\}$ and $\{w2 \in \mathbb{R} \mid w2 \geq 0\}$ and $\{w1+w2>0\}$;
   $\|FH\|$ is an Euclidian distance in the 3D immersive environment between the position of the vertex Vertex and the position H of the oriented plane; and
   $\widehat{FH}$ is an angle in the 3D immersive environment between the normal of the vertex Vertex and the normal of the oriented plane.

2. The computer-implemented method of claim 1, wherein the identifying further comprises:
   casting a ray from the determined parallel segment parallel to a center of the 3D object.

3. The computer-implemented method of claim 1, wherein the term $\|FH\|$ of the function $f$ is replaced by $\|FH'\|$ with H' being computed by:

$$H' = E + EH * \max(1, a * (\|EO_{max}\|)/\|EH_{max}\|)$$

wherein:
   H' is the position of an oriented plane of a virtual hand;
   E is the position of the user's point of view;
   H is the position of the oriented plane formed by the opposed pads of the finger and the thumb;
   EH is a vector from E to H;
   Omax is the position of the furthest vertex of the 3D object from E;
   Hmax is the furthest position of the center of the user's hand from E in a transverse plane of the user's body;
   $\{a \in \mathbb{R}*\}$;
   $\|EOmax\|$ is the norm of the vector from E to Omax; and
   $\|EHmax\|$ is the norm of the vector from E to Hmax.

4. The computer-implemented method of claim 3, wherein the term $\|FH\|$ $\|FH'\|$ of the function $f$ further includes a Euclidean distance in the 3D immersive environment between a position of the vertex and at least one intersection of the 3D model with a ray being cast from a center of a head or a dominant eye or a point between eyes to a center of the 3D model.

5. The computer-implemented method of claim 1, wherein the identifying further comprises:
   determining the vertex of the 3D object having the closest position with the determined segment;
   computing one or more n-neighboring vertices of the determined vertex, the one or more n-neighboring vertices and the determined vertex forming a subset of selectable vertices; and
   identifying the vertex of the 3D object having a closest orientation with a oriented plane from the subset of selectable vertices.

6. The computer-implemented method of claim 5, further comprising: modifying a first rendering of the vertices of a subset of selectable vertices.

7. The computer-implemented method of claim 1, further comprising: modifying a second rendering of the identified vertex.

8. The computer-implemented method of claim 1, wherein a vertices of the 3D object may be part of triangles and/or part of quadrangles and/or part of topological faces and/or part of parametric surfaces and/or part of procedural surfaces.

9. The computer-implemented method of claim 1, wherein detecting the hand gesture including opposing the pads of the index finger and the thumb, the index finger and the thumb being substantially parallel.

10. The computer-implemented method of claim 1, further comprising:
    selecting the identified vertex of the 3D object by detecting that the hand gesture further includes contact between the pads of the index finger and the thumb.

11. The computer-implemented method of claim 10, further comprising:
    detecting whether the hand gesture further includes an abduction of all fingers; and
    deselecting the selected vertex.

12. A non-transitory data storage medium having recorded thereon a computer program including instructions allowing a computer to perform a method for selecting a vertex among vertices of a 3D object in a 3D immersive environment of a CAD system, each vertex having a position in the 3D immersive environment, the method comprising:
    displaying the 3D object in the 3D immersive environment;
    detecting a hand gesture including opposed pads of an index finger and thumb, both pads being spaced;
    determining a segment parallel to a segment connecting the pads of the index finger and the thumb, the determined segment having a position in the 3D immersive environment, the determined segment being created as a result of the detected hand gesture; and
    identifying the vertex of the 3D object having a closest position with the determined segment,
    wherein each vertex of the 3D object further has a normal and the opposed pads of the index finger and the thumb further form an oriented plane with a normal, and wherein the identifying further comprises:
    minimizing a function $f$:

$$f(\text{Vertex}) = w1 * \|FH\| + w2 * \widehat{FH}$$

wherein:

Vertex is the vertex of interest;

$\{w1 \in \mathbb{R} \mid w1 \geq 0\}$ and $\{w2 \in \mathbb{R} \mid w2 \geq 0\}$ and $\{w1+w2>0\}$;

$\|FH\|$ is an Euclidian distance in the 3D immersive environment between the position of the vertex Vertex and the position H of the oriented plane; and $\widehat{FH}$ is an angle in the 3D immersive environment between the normal of the vertex Vertex and the normal of the oriented plane.

13. The non-transitory data storage medium of claim 12, wherein the identifying further comprises:

casting a ray from the determined parallel segment parallel to a center of the 3D object.

14. The non-transitory data storage medium of claim 12, wherein the identifying of the method further comprises:

determining the vertex of the 3D object having the closest position with the determined segment;

computing one or more n-neighboring vertices of the determined vertex, the one or more n-neighboring vertices and the determined vertex forming a subset of selectable vertices; and identifying the vertex of the 3D object having a closest orientation with a oriented plane from the subset of selectable vertices.

15. The non-transitory data storage medium of claim 12, wherein the term $\|fh\|$ of the function $f$ is replaced by $\|fh'\|$ with H' being computed by:

$$H' = E + EH * \max(1, a*(\|EO_{max}\|/\|EH_{max}\|))$$

wherein:

H' is the position of an oriented plane of a virtual hand;

E is the position of the user's point of view;

H is the position of the oriented plane formed by the opposed pads of the finger and the thumb;

EH is a vector from E to H;

Omax is the position of the furthest vertex of the 3D object from E;

Hmax is the furthest position of the center of the user's hand from E in a transverse plane of the user's body;

$\{a \in \mathbb{R}*\}$;

$\|EOmax\|$ is the norm of the vector from E to Omax; and $\|EHmax\|$ is the norm of the vector from E to Hmax.

16. The non-transitory data storage medium of claim 15, wherein the term $\|FH\|$ of $\|FH'\|$ the function $f$ further includes a Euclidean distance in the 3D immersive environment between a position of the vertex and at least one intersection of the 3D model with a ray being cast from a center of a head or a dominant eye or a point between eyes to a center of the 3D model.

17. A system comprising:

a display; and processing circuitry communicatively coupled with a memory, the memory storing a computer program for selecting a vertex among vertices of a 3D object in a 3D immersive environment of a CAD system, each vertex having a position in the 3D immersive environment that when executed by the processing circuitry causes the processing circuitry to be configured to:

display the 3D object in the 3D immersive environment, detect a hand gesture including opposing pads of an index finger and thumb, both pads being spaced, determine a segment parallel to a segment connecting the pads of the index finger and the thumb, the determined segment having a position in the 3D immersive environment, the determined segment being created as a result of the detected hand gesture, and identify the vertex of the 3D object having a closest position with the determined segment, wherein each vertex of the 3D object further has a normal and the opposed pads of the index finger and the thumb further form an oriented plane with a normal, and wherein the processing circuitry is further configured to identify the vertex by being further configured to:

minimizing a function $f$:

$$f(Vertex) = w1 * \|FH\| + w2 * \widehat{FH}$$

wherein:

Vertex is the vertex of interest;

$\{w1 \in \mathbb{R} \mid w1 \geq 0\}$ and $\{w2 \in \mathbb{R} \mid w2 \geq 0\}$ and $\{w1+w2>0\}$;

$\|FH\|$ is an Euclidian distance in the 3D immersive environment between the position of the vertex Vertex and the position H of the oriented plane; and $\widehat{FH}$ is an angle in the 3D immersive environment between the normal of the vertex Vertex and the normal of the oriented plane.

18. The system of claim 17, wherein the processing circuitry is further configured to identify the vertex by being configured to cast a ray from the determined parallel segment parallel to a center of the 3D object.

* * * * *